US010864595B2

(12) United States Patent
Hwang et al.

(10) Patent No.: US 10,864,595 B2
(45) Date of Patent: Dec. 15, 2020

(54) METHOD OF PROJECTION WELDING HARDWARE TO STEEL SHEET FOR HOT STAMPING

(71) Applicants: Hyundai Motor Company, Seoul (KR); Kia Motors Corporation, Seoul (KR)

(72) Inventors: Yeon-Jung Hwang, Seoul (KR); Young-Tae Kim, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 400 days.

(21) Appl. No.: 15/857,209

(22) Filed: Dec. 28, 2017

(65) Prior Publication Data
US 2018/0250766 A1   Sep. 6, 2018

(30) Foreign Application Priority Data
Mar. 6, 2017   (KR) .......................... 10-2017-0028076

(51) Int. Cl.
| | |
|---|---|
| *B23K 11/11* | (2006.01) |
| *B23K 9/09* | (2006.01) |
| *B23K 9/10* | (2006.01) |
| *B23K 11/25* | (2006.01) |
| *B23K 11/00* | (2006.01) |

(Continued)

(52) U.S. Cl.
CPC ................ *B23K 11/11* (2013.01); *B23K 9/09* (2013.01); *B23K 9/1068* (2013.01); *B23K 11/0046* (2013.01); *B23K 11/14* (2013.01); *B23K 11/163* (2013.01); *B23K 11/25* (2013.01); *B23K 2101/006* (2018.08); *B23K 2101/18* (2018.08); *B23K 2101/34* (2018.08); *B23K 2103/04* (2018.08); *C23C 2/26* (2013.01)

(58) Field of Classification Search
CPC ..... B23K 11/166; B23K 11/163; B23K 11/16; B23K 11/18; B23K 11/185; B23K 11/20; B23K 11/14; B23K 9/09; B23K 9/1068; B23K 11/0046; B23K 11/25; B23K 2101/18; B23K 2101/34; B23K 2101/006; B23K 2103/04; C23C 2/26
See application file for complete search history.

(56) References Cited

U.S. PATENT DOCUMENTS

2008/0241572 A1* 10/2008 Miyamoto ............ B23K 11/115
                                                              428/600
2010/0282718 A1* 11/2010 Ananthanarayanan ......................
                                                              B23K 11/115
                                                              219/118

(Continued)

FOREIGN PATENT DOCUMENTS

| | | |
|---|---|---|
| JP | 2005-297054 A | 10/2005 |
| JP | WO 2016/013212 A1 | 1/2016 |
| KR | 10-2003-0090610 A | 11/2003 |

*Primary Examiner* — Janie M Loeppke
(74) *Attorney, Agent, or Firm* — Morgan, Lewis & Bockius LLP (57) ABSTRACT

A method of projection welding hardware to a plated steel sheet for hot stamping, may include pressing hardware and a plated steel sheet in a state in which a welding projection on the hardware is in contact with the plated steel sheet, supplying a primary current to the hardware and the plated steel sheet in a state in which they are pressed, and supplying a secondary current to the hardware and the plated steel sheet.

7 Claims, 6 Drawing Sheets

(51) Int. Cl.
_B23K 11/16_ (2006.01)
_B23K 11/14_ (2006.01)
_B23K 101/34_ (2006.01)
_B23K 101/18_ (2006.01)
_B23K 101/00_ (2006.01)
_B23K 103/04_ (2006.01)
_C23C 2/26_ (2006.01)

(56) References Cited

U.S. PATENT DOCUMENTS

2015/0239061 A1* 8/2015 Hamlock ............ B23K 11/004
  219/93
2016/0059343 A1* 3/2016 Nam .................. B23K 11/11
  219/93

* cited by examiner

METHOD OF PROJECTION WELDING HARDWARE TO STEEL SHEET FOR HOT STAMPING

CROSS-REFERENCE(S) TO RELATED APPLICATIONS

The present application claims priority to Korean Patent Application No. 10-2017-0028076, filed on Mar. 6, 2017, the entire contents of which is incorporated herein for all purposes by this reference.

BACKGROUND OF THE INVENTION

Field of the Invention

The present invention relates to a method of projection welding hardware to a steel sheet for hot stamping, and more particularly, the present invention relates to a method of projection welding hardware to a steel sheet for hot stamping, which includes a preliminary current application step of facilitating removal of a plated layer before a main current application step to enlarge weld nuggets and improve weld strength by two-stage current application.

Description of Related Art

Conventional press forming is performed in a cold temperature state, but hot stamping is performed at a high temperature.

The hot stamping is free from restraint of formability and can accomplish ultra-high strength by heat treatment since elongation of material is greatly increased at a high temperature.

However, the high-temperature safety of a material is essential since the hot stamping is generally performed at a high temperature of 900° C. or more, and thus plated steel sheets are typically used for hot stamping.

A galvanized steel sheet is mainly used for vehicles, wherein an Al—Si-plated steel sheet having a plated layer, which is formed on a surface thereof and includes an Al—Si alloy, is mainly used for hot stamping. The present case is to prevent evaporation of the plated layer during high-temperature heat treatment since Al evaporates at a very high temperature of 2467° C. compared to Zn that evaporates at a temperature of 907° C.

Electric resistance welding is a method of bonding objects to be welded by melting the objects as base metals using electric resistance heat, which is generated in the contact portion between the objects by applying a current thereto, and by applying an external force to the objects. In the present case, the generated resistance heat is expressed by the following Equation according to Joule's law:

$$Q=0.24I^2Rt,$$

where Q: heat quantity (cal), I: current (A), R: electric resistance (Ω), and t: time (s).

Figure 1:
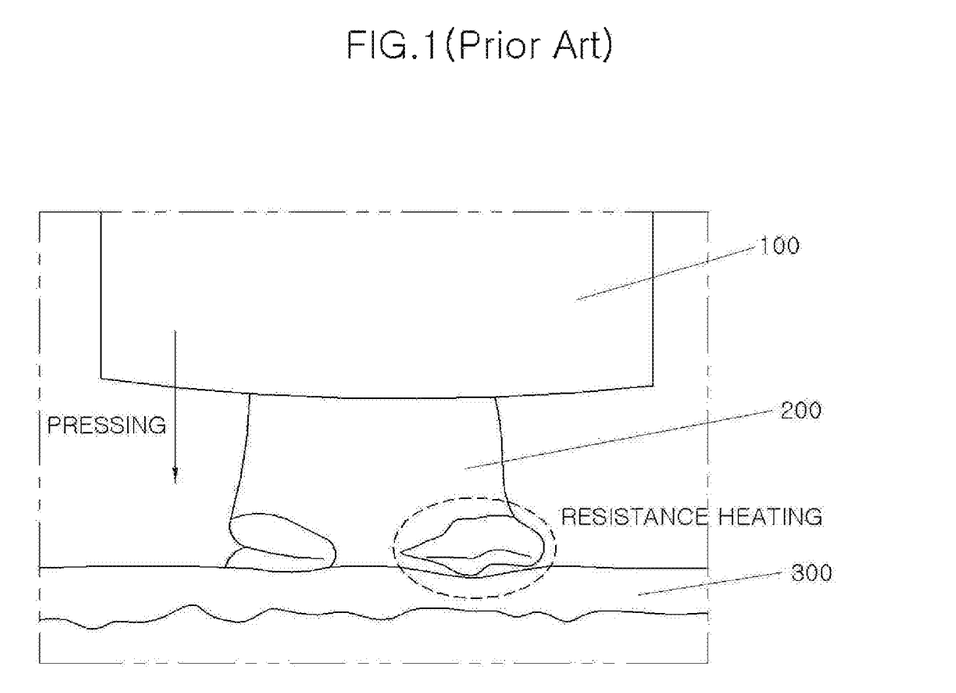
FIG. 1 is a photograph illustrating a method of projection welding hardware (nut) to a steel sheet for hot stamping.

Projection welding is one of various electric resistance welding methods. As illustrated in FIG. 1, the projection welding is a type of resistance welding method of bonding metal members by applying a pressure to projections formed on the bonding portion of one metal member coming into contact with the other metal member and by applying resistance heat, which is generated by applying a current thereto, to the limited relatively small specific portions of the metal members.

Figure 2:
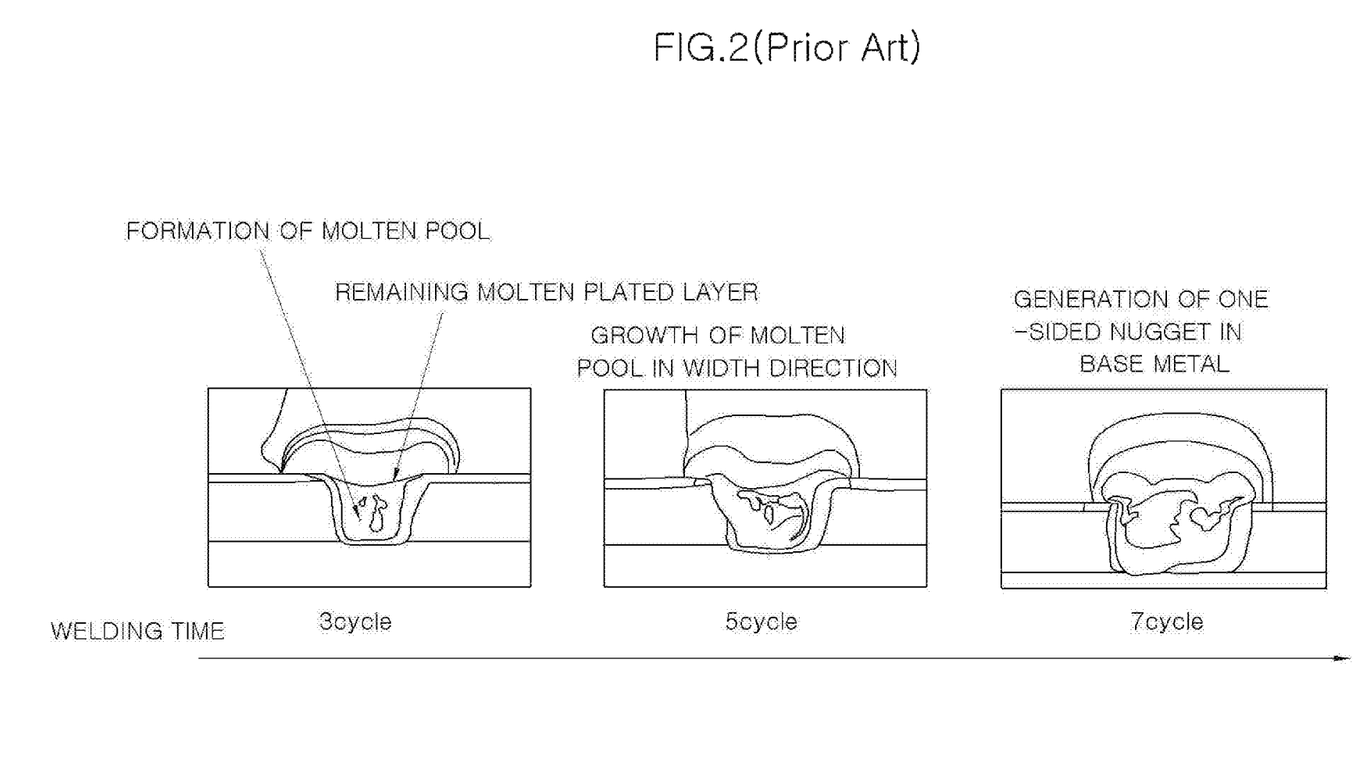
FIG. 2 is a photograph illustrating a problem when hardware is bonded to a steel sheet for hot stamping by projection welding according to the related art.

However, when a weld nut is welded to an Al—Si steel sheet for hot stamping by projection welding, a good weld nugget may not be formed due to an Al—Si-plated layer. As illustrated in FIG. 2, the molten Al—Si-plated layer remains on the interface between the nut and the steel sheet, and hence a molten pool is hindered from growing in a direction of the nut so that the nugget grows only in a width direction thereof. As a result, a one-sided nugget is formed in the base metal.

That is, since the steel sheet for hot stamping has the smallest range for good welding and low weld strength, compared to uncoated steel sheets and galvanized steel sheets, the steel sheet for hot stamping may have very low weldability.

Accordingly, there is a demand for additional process, including a $CO_2$ welding process to compensate for a lack of weld strength or a tapping process to remove contamination of threads due to spatters.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of projection welding hardware to a steel sheet for hot stamping, which includes a preliminary current application step of facilitating removal of a plated layer before a main current application step to enlarge weld nuggets and improve weld strength by two-stage current application.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, a method of projection welding hardware to a plated steel sheet for hot stamping may include pressing hardware and a plated steel sheet in a state in which a welding projection on the hardware is in contact with the plated steel sheet, supplying a primary current to the hardware and the plated steel sheet in the state in which they are pressed, and supplying a secondary current to the hardware and the plated steel sheet.

The method may further include cooling the plated steel sheet and the hardware that are heated in the supplying the primary current, between the supplying the primary current and the supplying the secondary current.

The primary current may have a value which is equal to or greater than the secondary current.

The primary current may have a value of 100% to 150% of the secondary current.

The primary current may have a value of 110% of the secondary current.

The primary current may be applied until the welding projection is collapsed by heating wherein a plated layer is pushed and removed.

The primary current may be applied for a period of 5 cycles or less.

The plated steel sheet may be an Al—Si-plated steel sheet.

In the cooling of the plated steel sheet and the hardware, the plated steel sheet and the hardware may be cooled slowly after the supply of the primary current is stopped.

The cooling the plated steel sheet and the hardware may be performed until the plated steel sheet and the hardware are in thermal equilibrium.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms and words used in the specification and claims should not be construed as their ordinary or dictionary sense. On the basis of the principle that the inventor can define the appropriate concept of a term to describe one's own invention in the best way, it should be construed as meaning and concepts for complying with the technical idea of the present invention. In addition, detailed descriptions of functions and constructions well-known in the art may be omitted to avoid unnecessarily obscuring the gist of the present invention.

Figure 3:
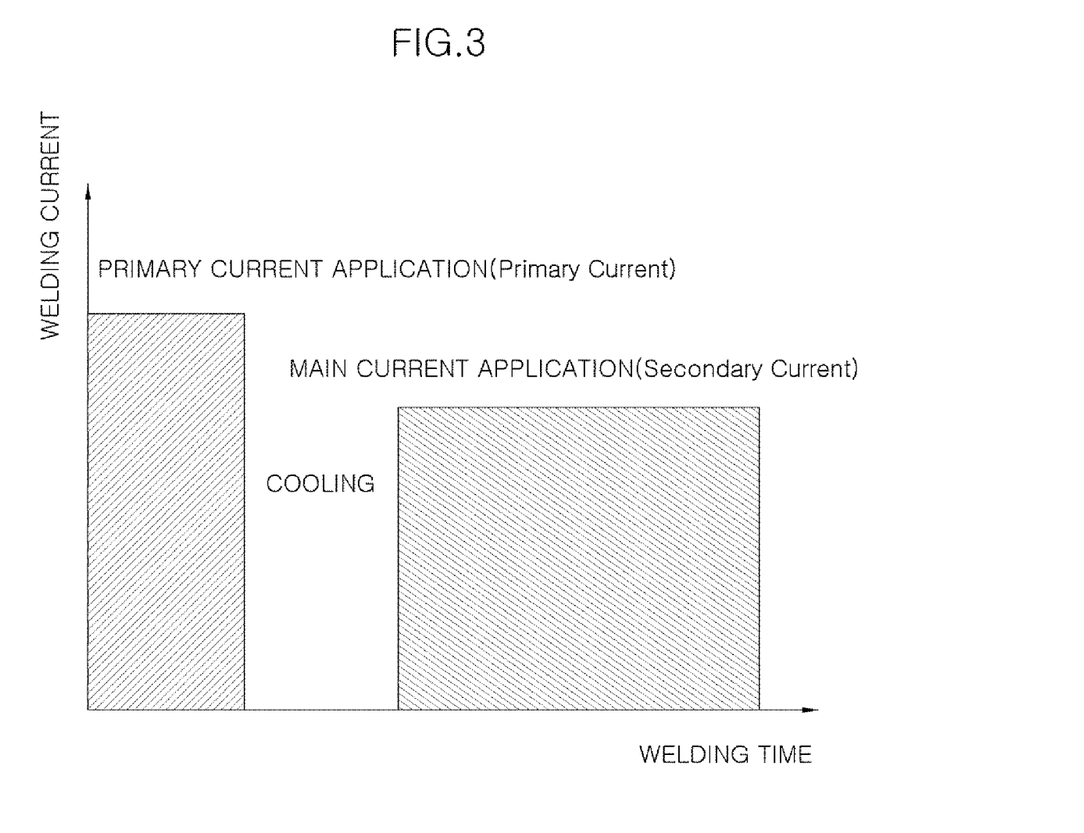
FIG. 3 is a graph illustrating a method of projection welding hardware to a steel sheet for hot stamping according to an exemplary embodiment of the present invention.

FIG. 3 is a graph schematically illustrating a method of projection welding hardware to a steel sheet for hot stamping according to an exemplary embodiment of the present.

The present invention is characterized in that hardware, i.e. a weld nut (hereinafter, referred to as "hardware") having a plurality of welding projections is bonded to a steel sheet forming a vehicle body panel by projection welding, and a steel sheet for hot stamping having an Al—Si-plated layer formed on a surface thereof is used for the projection welding to secure high weld strength by including a preliminary current application step of removing the Al—Si-plated layer (hereinafter, referred to as "plated layer") hindering growth of a molten pool before a main current application step.

Referring to FIG. 3, the method of projection welding hardware to a steel sheet for hot stamping according to the exemplary embodiment of the present invention is a method of bonding hardware to a plated steel sheet for hot stamping by projection welding, and includes a step of pressing hardware and a plated steel sheet in a state in which a plurality of welding projections formed on the hardware is in contact with the plated steel sheet, a preliminary current application step of supplying a primary current to the hardware and the plated steel sheet in a state in which they are pressed, and a main current application step of supplying a secondary current to the hardware and the plated steel sheet.

First, in the pressing step, the welding projections formed on the hardware are in close contact with the steel sheet by respectively pressing the hardware and the steel sheet using a steel sheet pressure tip and a hardware pressure tip in the state in which the welding projections are in contact with the steel sheet, as illustrated in FIG. 1. Then, in the present state, a current is supplied to the hardware and the steel sheet through the respective pressure tips, configured as electrodes, and is concentrated on the welding projections so that the welding projections and steel sheet portions coming into contact with the same are melted, allowing the welding projections of the hardware to be bonded to the steel sheet, as will be described later.

Furthermore, in the state in which the hardware and the steel sheet are pressed, the preliminary current application step is performed so that a molten plated layer is extruded out of the welding projections, as will be described later.

The state in which the hardware and the steel sheet are pressed may continue until the main current application step, and the pressure intensity or time period may be adjusted as necessary.

Next, a current application step for supplying of current is conducted to melt the welding projections and the steel sheet by resistance heating. Various aspects of the present invention are directed to providing a two-stage current application method (hereinafter, referred to as "multistage current application") that includes a main current application step and a preliminary current application step.

The preliminary current application step may be included before the main current application step, and is configured to remove the plated layer before the main current application step.

In the preliminary current application step of the present invention, a primary current is supplied to the hardware and the steel sheet through the respective pressure tips in the state in which the hardware and the steel sheet are pressed. In the present case, the primary current preferably has a value which is equal to or greater than the secondary current supplied in the main current application step.

To melt the plated layer including an Al—Si alloy, an intensity of the primary current may be large enough that a weld nugget may grow in the main current application step at least after the preliminary current application step, due to aluminum with high thermal conductivity. Accordingly, when current having a value less than the secondary current is supplied to the hardware and the steel sheet, the aluminum-plated layer with high thermal conductivity may not melt. However, when an excessively high current is supplied to the hardware and the steel sheet, the hardware may deteriorate due to excessive heat. Therefore, a current having a value of 100% to 150% of the secondary current is preferably supplied in the preliminary current application step. A current having a value of 110% of the secondary current supplied in the main current application step is supplied in the preliminary current application step.

Figure 5:
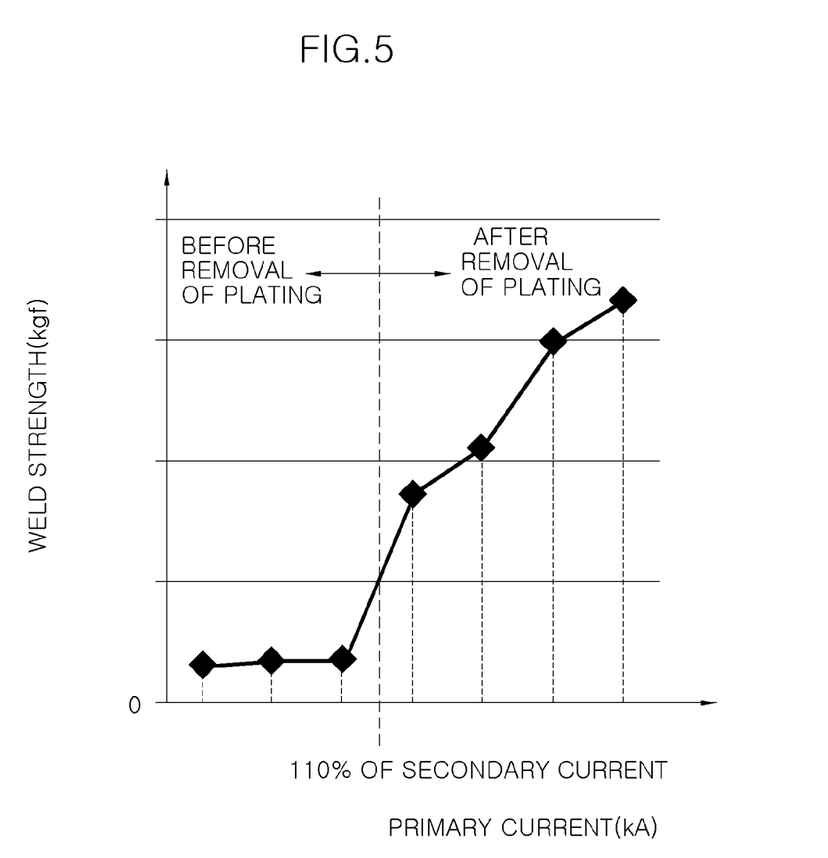
FIG. 5 is a graph illustrating weld strength according to application of a current in a preliminary current application step according to an exemplary embodiment of the present invention.

Referring to FIG. 5, the weld strength is very low since the plated layer is not removed when the current has a value less than 110% of the secondary current; however, the weld strength is high since the plated layer is sufficiently melted and removed when the current has a value of 110% or more of the secondary current.

Furthermore, the current application time period in the preliminary current application step is preferably a time period until at least the welding projections are melted and collapsed. The above reason is because the plated layer formed on the surface of the steel sheet is melted by the primary current supplied thereto, the welding projections are melted and collapsed by heat generated from the contact surface with the plated layer, and the molten plated layer is extruded out of the bonding portion, i.e. The hardware, to be removed by the collapsed projections in the state in which they are pressed.

Figure 6:
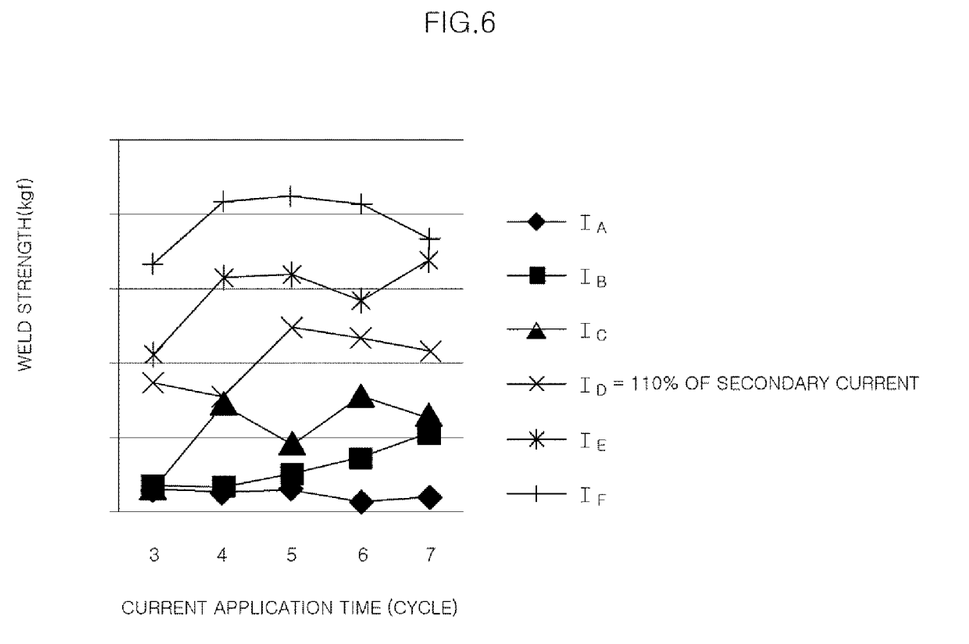
FIG. 6 is a graph illustrating weld strength according to a current application time in the preliminary current application step according to an exemplary embodiment of the present invention.

FIG. 6 is a graph illustrating weld strength according to a current application time period for each current. In FIG. 6, the weld strength is insignificantly improved even though the current application time period is increased after the welding projections are melted and collapsed when the primary current has a value of 110% or more of the secondary current ($I_D$, $I_E$, and $I_F$) and the current application time period exceeds 5 cycles. Thus, the primary current is preferably supplied until the projections are collapsed and the molten plated layer is extruded and removed. In an exemplary embodiment of the present invention, the current application time period may be between 3 cycles to 5 cycles when the primary current has a value of 110% or more of the secondary current. In an exemplary embodiment of the present invention, the current application time is expressed as a cycle, and 1 cycle refers to 1/60 s.

However, in the preliminary current application step, the temperatures of the steel sheet and the hardware are also increased due to heat by contact resistance in the contact surface between the steel sheet and the welding projections of the hardware by the primary current supplied thereto, and the specific resistances of the steel sheet and the hardware are increased in proportion to the increase of the temperature. In an exemplary embodiment of the present invention, since the steel sheet has a higher specific resistance than the hardware, the steel sheet has a higher heating value and hence the heat between the steel sheet and the hardware is unbalanced. Thus, to reduce the unbalanced heat, it is necessary to form a thermal equilibrium between the steel sheet and the hardware, which are heated, before the main current application step after the preliminary current application step.

Accordingly, the projection welding method of the present invention further include a cooling step of cooling the steel sheet and the hardware, which are heated in the preliminary current application step, after the preliminary current application step. In an exemplary embodiment of the present invention, the cooling step may be performed such that the steel sheet and the hardware are cooled slowly by shutting off the supply of the current, or are cooled by coolant accommodated in each of the pressure tips configured as electrodes.

Figure 4:
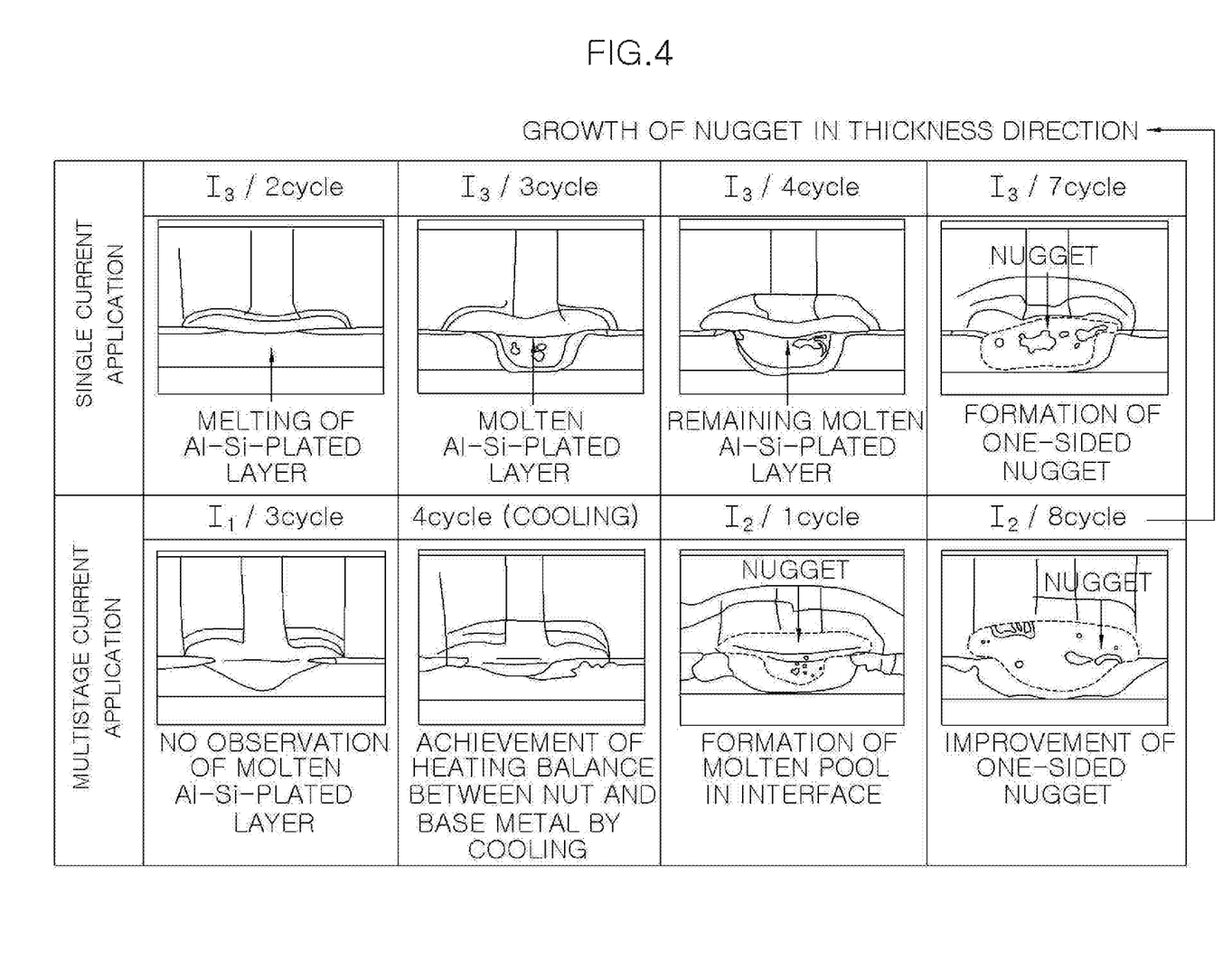
FIG. 4 is a comparative photograph of conventional single current application and multistage current application illustrating exceptional growth of a weld nugget through removal of a plated layer by the multistage current application when hardware is bonded to a steel sheet for hot stamping by projection welding according to an exemplary embodiment of the present invention.

FIG. 4 is a comparative photograph of conventional single current application and multistage current application illustrating exceptional growth of the weld nugget through removal of the plated layer by the multistage current application when the hardware is bonded to the steel sheet for hot stamping by projection welding according to the exemplary embodiment of the present invention.

As illustrated in FIG. 4, in the multistage current application of the present invention, the plated layer on the surface of the steel sheet is removed by applying a current of $I_1$ thereto for 3 to 5 cycles and applying a current of $I_2$, which is less than $I_1$, thereto, and a molten pool may grow in a direction of the hardware as well as the steel sheet since the plated layer hindering the growth of the molten pool is removed from the bonding portion. Then, a weld nugget is formed through the cooling step. However, it is necessary to sufficiently increase the size of the weld nugget to improve the weld strength of the welding portion.

On the other hand, in the single current application according to the related art, a one-sided nugget is formed since the plated layer remains when a current of $I_3$ is applied thereto.

Here, $I_3$ may be equal to or less than $I_2$, but has a value less than $I_1$.

Accordingly, in an exemplary embodiment of the present invention, in the state in which the steel sheet and the hardware are in thermal equilibrium through the cooling step, the secondary current is again supplied to the steel sheet and the hardware through the respective pressure tips in the main current application step. Since the formed weld nugget grows in the above step, a heating value is increased as a current value is increased, and spatters may occur due to excessive heat during welding. Therefore, a high current may be supplied for process efficiency in a range in which the occurrence of spatters is minimized.

In accordance with exemplary embodiments of the present invention, it is possible to secure the growth of a molten pool by including a preliminary current application step before a main current application step and by removing an aluminum-plated layer hindering the molten pool from growing in a bonding portion.

Furthermore, since the aluminum-plated layer is removed, it is possible to prevent a reduction in weld strength due to the solution or alloying of aluminum in a weld nugget of the bonding portion.

Moreover, it is possible to prevent deterioration of a nut by cooling the hardware and the steel sheet which are heated in the preliminary current application step to form a thermal balance therebetween.

Furthermore, it is possible to achieve process efficiency by increasing weld strength through the removal of the plated layer without separate additional processes.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by Claims appended hereto and their equivalents.

What is claimed is:

1. A method of projection welding hardware to a plated steel sheet for hot stamping, the method comprising:
    pressing hardware and a plated steel sheet in a state in which a welding projection on the hardware is in contact with the plated steel sheet;
    supplying a primary current to the hardware and the plated steel sheet in a state in which the hardware and the plated steel sheet are pressed; and
    supplying a secondary current to the hardware and the plated steel sheet,
    wherein the primary current has a value of 100% to 150% of the secondary current so that a plated layer of the plated steel sheet is melted and removed, and
    wherein the secondary current has a value of a welding temperature.

2. The method of claim 1, further including cooling the plated steel sheet and the hardware that are heated in the supplying of the primary current, between the supplying of the primary current and the supplying of the secondary current.

3. The method of claim 1, wherein the primary current is applied for a time period until the welding projection is collapsed by heating so that the plated layer is extruded and removed.

4. The method of claim 3, wherein the primary current is applied for the time period of 5 cycles or less.

5. The method of claim 1, wherein the plated steel sheet is an Al—Si-plated steel sheet.

6. The method of claim 2, wherein, in the cooling the plated steel sheet and the hardware, the plated steel sheet and the hardware are cooled after the supplying of the primary current is stopped.

7. The method of claim 2, wherein the cooling of the plated steel sheet and the hardware is performed until the plated steel sheet and the hardware are thermally balanced.

* * * * *